United States Patent [19]

Lahti

[11] Patent Number: 4,929,010
[45] Date of Patent: May 29, 1990

[54] PORTABLE LIFTER

[76] Inventor: Gary P. Lahti, 520 Howard St., Lunenburg, Mass. 01462

[21] Appl. No.: 426,563

[22] Filed: Oct. 25, 1989

[51] Int. Cl.$^5$ ............................................. B25B 7/04
[52] U.S. Cl. ..................................... 294/16; 294/50.8; 294/118; 37/2 R; 47/76
[58] Field of Search ............... 47/76; 37/2 R; 294/16, 294/118, 50.8

[56] References Cited

U.S. PATENT DOCUMENTS

| | | | |
|---|---|---|---|
| 289,186 | 11/1883 | Visscher | 294/50.8 X |
| 900,735 | 10/1908 | Holmberg | 294/118 |
| 1,344,174 | 6/1920 | Clogston | 294/118 |

FOREIGN PATENT DOCUMENTS 2186773  8/1987  United Kingdom ............... 294/50.8

Primary Examiner—Dennis L. Taylor
Assistant Examiner—Arlen L. Olsen
Attorney, Agent, or Firm—Robert L. McKellar

[57] ABSTRACT

This invention deals with a portable lifter of the kind designed to fit around the balled earth and root system or bagged earth and root system of a shrub or a tree. The device of the instant invention is fabricated from light-weight metal such as aluminum or very light steel. It is believed by the inventor herein that this device is most useful in tree and shrub nurserys to allow the transportation of such trees and shrubs.

1 Claim, 2 Drawing Sheets

PORTABLE LIFTER

BACKGROUND OF THE INVENTION

This invention deals with a portable lifter of the kind designed to fit around the balled earth and root system or bagged earth and root system of a shrub or a tree. The common practice, in preparing trees for transportation, storage, and transplanting, is to dig around the roots of the tree at a suitable distance from the trunk or stem to leave a ball of dirt on the roots and then this ball of dirt and the roots are enclosed in a burlap covering to hold the dirt on the roots during storage or handling. Once the tree roots are secured in this manner, it is customary to move them for transplanting purposes without unsecuring the burlap covering from the earth and root system. The trees are lifted and transplanted in this manner.

Lifting balled trees or potted trees has always been a task due to the awkward shape, size, and weight of the tree. Devices have been made to aid digging and moving trees from one area to another.

Most of the devices that are used today consist of motor equipped devices that not only assist in holding the balled tree, but they also assist in the digging and removal of such trees from the ground.

One such device is set forth in U.S. Pat. No. 2,769,278 issued on Nov. 6, 1956 to Frank and George Wassell in which there is shown a very complicated digging device with cutting plates, chain drives and the like.

Another such device is a tree digger and container disclosed in U.S. Pat. No. 2,988,393, issued on June 13, 1961 to John Logan in which there is shown a side digger which is forced into the ground and which encircles the roots and eventually severs the roots from the ground and creates a container for the storage of the tree.

A more common type of transplanting device can be found in the disclosure of Sigler, et al. as U.S. Pat. No. 3,017,719, issued Jan. 23, 1962, where there is shown a cone shaped device, mounted on a tractor or truck, and which allows conical flaps to dig down around the root system of a tree and essentially enclose the main root system of the tree and whereby the tree can be lifted out of the ground.

An analogous device including a flat bed or trailer for floating the removed tree is shown in U.S. Pat. No. 3,032,368 also to Sigler et al.

In U.S. Pat. No. 3,045,368, issued to L. Whitcomb, there is disclosed a device which is used for removing or balling a bush or tree with a mechanism capable of moving a pair of semi-cylindrical knife supporting members around the base of a bush or tree, closing the same to form a circular downwardly pointing knife assembly and then causing both of the semi-circular knives to swing transversely in an arc of 90° to cut down and around the roots of the bush or tree, and loosen the soil and roots in an area in the form of a half sphere, lifting the bush or tree together with this half sphere or ball of earth and depositing the same in a holder upon a burlap sheet so that the burlap sheet can be raised over the surface of the ball for fastening together around the base or trunk of the bush or tree.

Sigler, et al. in U.S. Pat. No. 3,161,989, issued Dec. 22, 1964 discloses a device similar to the device of the earlier discussed Sigler, et al patent. U.S. Pat. No. 3,017,719. Analgous devices can be found in U.S. Pat. No. 4,179,847, issued Dec. 25, 1979 to Jean-Pierre Osterwalder: U.S. Pat. No. 4,301,605, issued Nov. 24, 1981 to Christopher Newman: U.S. Pat. No. 4,351,252, issued to Arthur Dahlquist on Sept. 28, 1982, and U.S. Pat. No. 4,658,518, issued to Albert Korenek on Apr. 21, 1987.

As can be observed by those skilled in the art, these devices are large in structure, complicated, awkward, expensive, and have as their primary purpose, the digging of trees, that is, the transportation of the dug trees is secondary in these references.

The most pertinent reference within the knowledge of the inventor herein is the U.S. Pat. No. 2,549,476, issued on Apr. 17, 1951 to W. B. Johnson, in which there is shown a hand operated transplanting digger for shrubs and trees. The digger comprises a digging scoop of bowl shape, divided along a vertical plane to form two cooperating halves. The two halves are pivotally supported at their corners on horizontal axes so that they may be rotated from a closed position through substantially 90° to a digging position where they may be forced into the ground. The edges of the two halves of the scoop adjacent the dividing plane constitute the digging edges. When pressure is applied on each of the set of handles, the apparatus digs into the earth and scoops under the roots and severs them. The rotating scoop halves are then locked together to form a container in which to carry the balled earth and roots. The digger/carrier is then ready to be moved.

SUMMARY OF THE INVENTION

The instant invention comprises a u-shaped designed tree lifter which allows the lifter to be place on top of the ball and around the trunk of the tree allowing the feet and crossfingers of the device to be centered on the ball. By lifting each handle, the feet and the crossfingers press on the ball. The lifter of the instant invention can be adjusted to accomodate various sizes of trees. It should be noted that the tree does not have to be placed or rolled on to the lifter, it simply is placed on the top of the ball.

Thus, this invention deals with a lifter, wherein the lifter comprises in combination a left leg and a right leg which legs are pivotally joined at or near their mid-section by a pin wherein each leg comprises a handle at one end and a foot at it's opposite end and each handle is attached such that it forms a T-shape with it's leg wherein one such foot is attached to the right leg such that it forms an L-shape and one such foot being attached to the left leg such that it forms a J-shape. The handles and feet are aligned in the same plane and each foot has attached thereto an arm with each arm having at least one semicircular cross finger attached thereto and all semicircular cross fingers are arranged such that their concave sides face each other and the legs are arranged such that they pivot around the pin when the handles are moved toward each other.

DESCRIPTION OF THE PREFERRED EMBODIMENTS

Figure 1:
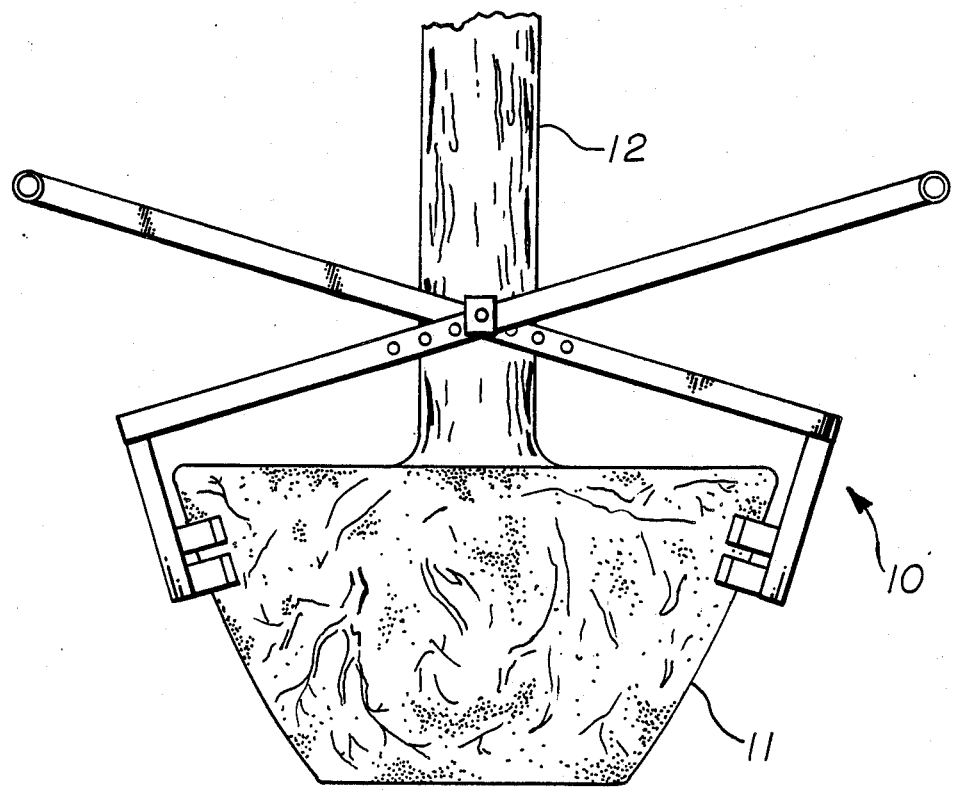
FIG. 1 is a full view of one of the devices of this invention in place around the ball of a tree.

Referring now to the drawings in which like-numbers indicate like-parts or pieces, there is shown in FIG. 1 a full view of one of the devices 10 of this invention in place around the ball 11 of a tree 12, shown only a part of the lower trunk of the tree.

Figure 2:
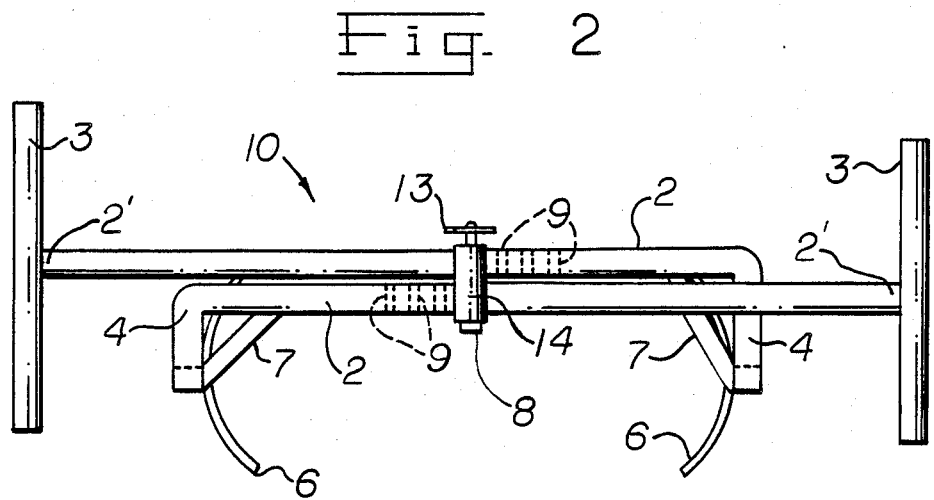
FIG. 2 is a full top view of a device of this invention.
Figure 3:
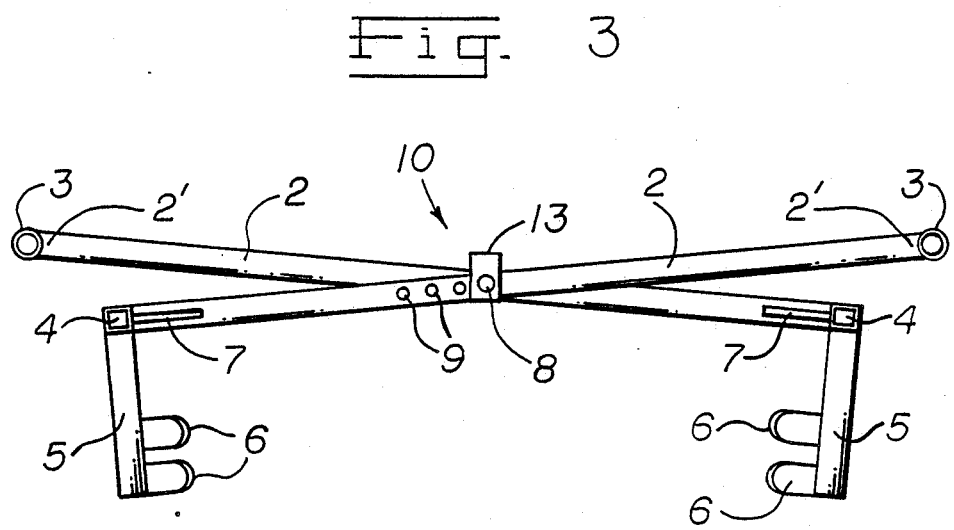
FIG. 3 is a front view of a device of this invention.

With reference to FIGS. 2 and 3, there is shown therein one of the devices of the instant invention 10 which is comprised of two tubular legs 2, each of which have mounted on their distal ends 2', handles 3. The handles 3 are integrally mounted such that they form a T-shape with each of the legs 2. The alignment of the handles 3 with the rest of the device will be discussed infra.

The ends of each of the legs 2 that are opposite of the handles 3, terminate in a foot 4, which is integrally attached and forms a continuum with the legs 2. With one of the legs 2 the foot 4 forms a J-shape and with the other leg 2, the foot 4 forms an L-shape, the need for the configuration of each such leg becoming apparent infra in this disclosure, it further being understood that the combination of the handles, legs, and feet can be a continuous piece and not segmented.

Each of the feet 4 of the legs 2 has an arm 5 (see FIG. 3) which is attached such that it hangs perpendicular to the foot 4. This arm 5 serves to hold the semicircular cross fingers 6 which in FIG. 3 are shown as two such cross fingers 6. It is possible to have only one such cross finger 6 per foot 4, but the preferred number of cross fingers 6 is at least two per foot 4 in order to stabilize the tree when it is lifted.

Each of the cross fingers 6 is semicircular in design, in order to accomodate the outside configuration of the ball and to allow a tight grip on the surface of the ball when the ball is being transported. To be effective, the crossfingers 6 have to have their concave surfaces facing each other in order to configure with the surface of the ball.

With reference to FIG. 2, it can be observed that each of the feet 4 are braced to the legs 2 with a metal gusset 7, which metal gussets are generally welded for stability and strength.

Also with reference to FIG. 2, it can be observed that the two legs 2 are pivotally attached to each other by a pin 8, which pin can be fastened with any retaining means 13 (see FIG. 2) to prevent it's escape from the pivot hole 9. Several such pivot holes 9 are shown in FIG. 2 in phantom. These pivot holes 9 allow the legs 2 to be adjusted to accomodate larger balled trees, and as can be observed from the Figures, the retaining means 13 is removed, the pin 8 is removed and the holes 9 can be realigned in any manner to give a broader or narrower gap between the feet 4. The pin 8 is then reinserted in the pivot hole 9 and the retaining means 13 is returned to the pin 8 to hold the device together.

When not in use, the device can be easily stored by removing the retaining means 13, pulling the pin 8, and storing the resulting two pieces.

When it is desired to use the device, the two pieces are retrieved, the pivot holes 9 are aligned, the pin 8 is inserted in the desired pivot holes 9, and the retaining means 13 is mounted on the pin 8.

In use, the lifter, which is the device of this invention, is opened by forcing the handles apart, the device is mounted on the ball to be lifted, the handles are lifted, essentially moving towards each other, and the crossfingers 6 of the device clamp unto the ball and the whole is lifted by the handles 3. It should be noted that the ball and the tree are not required to be lifted into the device, rather, this device is placed on the top of the ball. This device usually requires two people to lift the ball because of its weight, although the device can be mounted and unmounted by only one person.

The device of this invention is highly portable; is totally hand operated; can be used in very close quarters; is light weight, adjustable and is efficient.

The device of the instant invention is fabricated from lightweight metal such as aluminum or very light steel. Preferred for this invention is tubular material, especially square tubular material to enhance the strength of the device.

It is believed by the inventor herein that this device will most useful in tree and shrub nurserys to allow the transportation of such trees and shrubs.

What is claimed is:

1. A lifter, said lifter comprising in combination
   a left leg and a right leg which legs are pivotally joined at or near their mid-section by a pin;
   each said leg comprising a handle at one end and a foot at it's opposite end;
   each said handle being attached such that it forms a T-shape with it's leg;
   one such foot being attached to the right leg such that it forms an L-shape;
   one such foot being attached to the left leg such that it forms a J-shape;
   said handles and said feet being aligned in the same plane;
   each said foot having attached thereto an arm;
   each arm having at least one semicircular cross finger attached thereto and all semicircular cross fingers arranged such that their concave sides face each other;
   said legs being arranged such that they pivot around the pin when the handles are moved toward each other.

* * * * *